(12) United States Patent
Papayoanou et al.

(10) Patent No.: US 6,370,178 B1
(45) Date of Patent: Apr. 9, 2002

(54) WIDE AREA LASER AND MULTI-PASS LASER OPTICAL CAVITY FOR USE THEREIN

(75) Inventors: Aris Papayoanou, Aliso Viejo; Hai Huynh, San Marcos, both of CA (US)

(73) Assignee: IMED Lasers, San Marcos, CA (US)

( * ) Notice: Subject to any disclaimer, the term of this patent is extended or adjusted under 35 U.S.C. 154(b) by 0 days.

(21) Appl. No.: 09/217,495

(22) Filed: Dec. 21, 1998

(Under 37 CFR 1.47)

(51) Int. Cl.⁷ .......................... H01S 3/03; H01S 3/041; H01S 3/08
(52) U.S. Cl. ........................ 372/64; 372/35; 372/87; 372/95; 372/107
(58) Field of Search .................. 372/64, 83, 87, 372/99, 103, 107, 35, 95

(56) References Cited

U.S. PATENT DOCUMENTS

| | | | |
|---|---|---|---|
| 4,493,087 A | | 1/1985 | Laakman et al. |
| 4,787,090 A | * | 11/1988 | Newman et al. ............. 372/82 |
| 4,875,218 A | * | 10/1989 | Hongo et al. ................ 372/64 |
| 4,939,738 A | | 7/1990 | Opower |
| 5,048,048 A | * | 9/1991 | Nishimae et al. ............ 372/95 |
| 5,123,028 A | | 6/1992 | Hobart et al. |
| 5,155,739 A | | 10/1992 | Mefferd |
| 5,353,297 A | | 10/1994 | Koop et al. |
| 6,160,824 A | * | 12/2000 | Meissner et al. ............. 372/7 |

OTHER PUBLICATIONS

Donald R. Herriott et al., "Folded Optical Delay Lines", *Applied Optics*, Aug. 1965, vol. 4, No. 8, pp. 883–889.

J.G. Xin et al., "Compact, multipass, single transverse mode $CO_2$ laser", *Appl. Phys. Lett.*, 51 (7), Aug. 17, 1987, pp. 469–471.

K.M. Abramski et al., "Power scaling of large–area transverse radio frequency discharge $CO_2$ lasers", *Appl. Phys. Lett.*, 54 (19), May 8, 1989, pp. 1833–1835.

P.E. Jackson et al., "$CO_2$ large–area discharge laser using an unstable–waveguide hybrid resonator", *Appl. Phys. Lett.*, 54 (20), May 15, 1989, pp. 1950–1952.

Denis R. Hall et al., "Area scaling boosts $CO_2$–laser performance", *Laser Focus World*, Oct. 1989, pp. 77–80.

* cited by examiner

*Primary Examiner*—Quyen Leung
*Assistant Examiner*—James Menefee
(74) *Attorney, Agent, or Firm*—Brown, Martin, Haller & McClain

(57) ABSTRACT

In a laser, the optical cavity includes a pair of spaced-apart electrode plates which are RF excited transversely and a pair of substantially identical spherical mirrors having a radius of curvature, spacing and alignment selected to cause a beam within the cavity to make a plurality of round trips and mirror encounters along a set of off-axis paths, before returning, in phase, to its starting point. The multiple traversals of the cavity result in a long effective gain path equivalent to the number of round trips times the mirror spacing. The plurality of off-axis traversals of the laser beam trace out a plane around the gain region before exiting through the aperture in the first spherical mirror, permitting an effective utilization of the wide excitation region defined by the electrodes. In a $CO_2$ laser, the electrodes are separated by an electrode spacing such that the modes perpendicular to the electrodes are waveguide in nature to form a stable cavity resonator. Modes parallel to the electrodes are stable free space in nature, providing hybrid propagation. In other types of lasers, the cavity operates in free space mode in both directions. Similar principles may be applied to a laser crystal to provide off-axis, multi-beam operation in some solid state lasers.

38 Claims, 3 Drawing Sheets

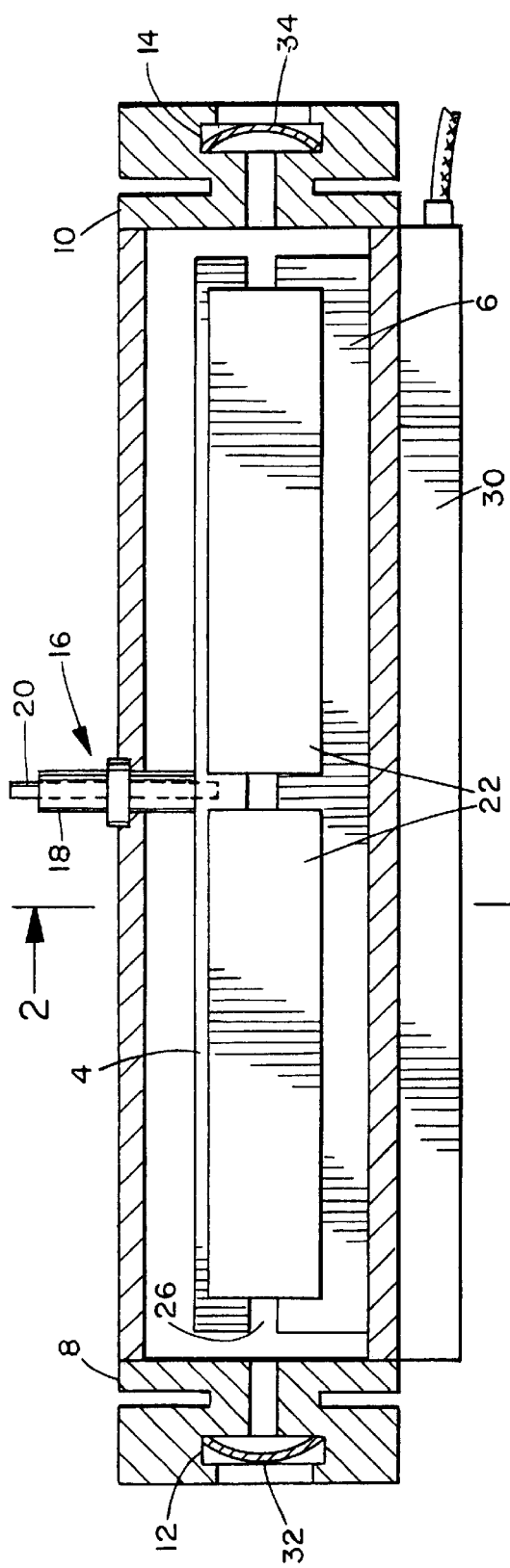
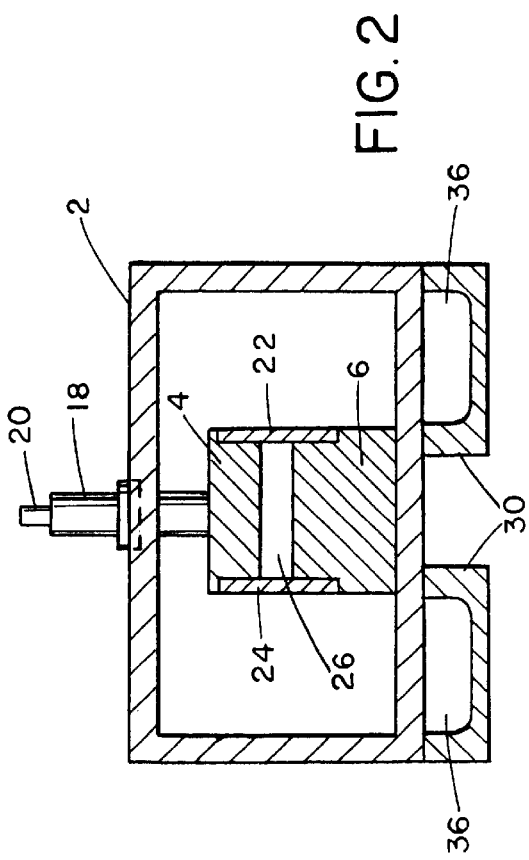

WIDE AREA LASER AND MULTI-PASS LASER OPTICAL CAVITY FOR USE THEREIN

BACKGROUND OF THE INVENTION

1. Field of the Invention

The present invention relates to a wide area laser and a laser optical cavity design for wide area lasers, and more particularly to a laser and a laser cavity having multiple off-axis oscillation paths.

2. Description of Related Art

Over the past several years, laser technology has become commonplace in a large number of military, industrial, research, medical and consumer applications. The widespread usage for lasers has increased the need for development of compact lasers that are reliable, durable and relatively inexpensive. Looking at one of the more widely used lasers, the $CO_2$ laser, conventional lasers capable of delivering substantial power have the disadvantages that high voltage D.C. is required for excitation, series ballast resistors are usually required to stabilize the discharge, the discharge tube may be long and fragile, and length scaling is required, with increased power being achieved by lengthening the optical cavity, all of which limit the availability and ease of use of the lasers. Other types of gas lasers are subject to similar disadvantages and limitations.

Area-scaled lasers first received attention in the mid- to late 1980s as being more easily excitable by radio-frequency (RF) discharges, diffusion-cooled, and scalable to achieve the desired power by varying the excitation electrode area. Slab, or wide area, laser cavities, comprising parallel planar electrodes, provide the advantage that the width of the electrode can be increased to increase the extractable power, thus minimizing the need for the length scaling that is required in prior art gas lasers. (See, e.g., K. M. Abramski, et al., "Power Scaling of Large-Area Transverse Radio Frequency Discharge $CO_2$ Lasers", *Appl. Phys. Lett.* 54 (19), May 8, 1989.) Assuming that the significant amount of heat generated by the large volumetric excitation can be dissipated, the issue of extracting the laser radiation in a useful form still remains. For most purposes, the optimal cross-section of a laser beam has a gaussian distribution, i.e., in the lowest order, $TEM_{00}$, transverse mode. Alternatively, a flattened gaussian distribution, "super gaussian", a donut mode, or a superposition of several lowest order modes, are all useful for industrial and medical purposes. For military sensors, lowest order gaussian or "super gaussian" modes are essential or highly desirable. Regardless of the application, conventional laser optical cavities cannot be used to extract energy from wide area discharges since such techniques yield highly multimode outputs which cannot be well collimated or tightly focused. While military sensors cannot use multimode lasers, such lasers are also undesirable or less desirable for industrial cutting, drilling, scribing, welding, etc. Even medical applications, which are more tolerant of multimode laser radiation, are better served by low order gaussian or donut modes which simplify the optical system that transports the laser to the tissue.

Considerable attention has been directed toward extracting the laser radiation from large area cross-sections in useful intensity profiles. Many workers in this area have used unstable resonators, including, for example, Opower (U.S. Pat. No. 4,939,738), Hobart, et al. (U.S. Pat. No. 5,123,028), Koop, et al. (U.S. Pat. No. 5,353,297), P. E. Jackson, et al., "$CO_2$ Large-Area Discharge Laser Using an Unstable-Waveguide Hybrid Resonator", *Appl. Phys. Lett.* 54 (20), May 15, 1989. See, also, A. E. Siegman, Lasers, University Science Books, 1986, Chapters 21–23. The resonators disclosed by Opower and Jackson, et al utilize a concave mirror at one end of the slab discharge and a convex mirror at the other end, just enough off-center to permit output coupling near the edge of the discharge slab. The electrodes are spaced apart by a small enough spacing, e.g., less than 3 mm, to create a waveguide in the electrode direction, leaving free space propagation in the wide direction. However, such an approach may be feasible only for larger (higher power) lasers.

Historical Development

With the exception of unstable resonators, most commercial lasers utilize optical cavities that were first analyzed and employed in the early 1960's. Such laser cavities, in which a beam retraces itself along a single axis after being reflected by a flat mirror at each end of the cavity, is a flat plate Fabry-Perot multibeam interferometer. Spherical mirrors are more commonly used in a version of the Fabry-Perot interferometer, confining the intracavity laser mode as shown in FIG. 8, where the values of $w_0$ and $w_1$, are the beam radius at the center and at the mirrors, respectively.

Other early forms of interferometers were configured to cause the beam to make one round trip along several different axes before returning to its starting point. For example, in the confocal Fabry-Perot interferometer illustrated in FIG. 9a, the beam makes two round trips, encountering four different mirror points. In a focal spaced Fabry-Perot interferometer, such as shown in FIG. 9b, a ray makes three round trips, encountering six points on the mirror surfaces. There is a large number of multi-beam interferometers in which a plurality of off-axis cavity round trips and mirror encounters occur before the beam returns, in phase, to its starting point. Such off-axis spherical mirror interferometers have been investigated for use in laser amplifiers (see, e.g., Herriot, et al., "Off-axis paths in spherical interferometers", *Appl. Optics*, 3, p. 523, April 1964, and Herriot, et al., "Folded optical delay lines", *Appl. Optics*, 4, p. 883, August 1965) and as Raman gain cells (Trutna, et al, "Multiple pass Raman gain cell", *Appl. Optics*, 19, p. 301, Jan. 15, 1980). In such optical resonators, for example, when a beam makes three round trips in a cavity before returning to its starting point, the cavity path is three times as long as that of the flat plate Fabry-Perot interferometer, and the cavity "free spectral range", i.e., the frequency spacing between adjacent longitudunal modes, is one-third as large. Such off-axis long path cells are often referred to as "White" cells (based on 1941 research in connection with increasing the sensitivity of absorption measurements), but are also known as "Herriot" cells.

The off-axis interferometer configuration has also been used for a laser cavity, as disclosed by J. G. Xin and D. R. Hall in "Compact, Multipass, Single Transverse Mode $CO_2$ Laser", *Appl. Phys. Lett.* 51 (7), Aug. 17, 1987. In this laser, the beam "walked" around an annular region between coaxial plates, achieving excellent transverse mode (near $TEM_{00}$) discharge and about 65 watts output. However, there are several drawbacks to the coaxial waveguide, including that it is difficult to both support and align the coaxial electrode and to feed it with RF energy. It is also difficult to align the cavity mirrors to allow the beam to optically "walk" around the annular region.

Accordingly, the need remains for a laser optical cavity design which is appropriate for use over a wide range of power levels which is durable and relatively easy to construct, and which is capable of providing power level and efficiencies equivalent to conventional laser many times longer.

SUMMARY OF THE INVENTION

It is an advantage of the present invention is to provide a highly compact gas laser which uses wide area electrodes in an off-axis, multi-pass resonator to create a long effective gain path with a short physical length.

It is another advantage of the present invention to provide a laser cavity design which effects a hybrid mode pattern, permitting extraction of useful laser radiation from wide area excitation.

Another advantage of the present invention is to provide a laser cavity design which allows use of a short physical length with a multi-path beam to produce laser radiation from wide area excitation.

Yet another advantage of the present invention to provide a stable optical resonator to extract high power, high efficiency laser radiation from a short, compact cavity.

Still another advantage of the present invention is to provide a carbon dioxide laser which produces a hybrid mode laser beam which is a combination of waveguide mode perpendicular to the electrode plates and free space mode parallel to the plates.

In an exemplary embodiment, a laser includes a pair of electrode plates which are RF excited transversely and an optical resonator defined by a pair of mirrors. For use in a sealed $CO_2$ laser, the electrodes are separated by an electrode spacing such that the modes perpendicular to the electrodes are waveguide in nature. The close spacing of the electrodes provides not only beam guidance, but also efficient thermal diffusion cooling. Due to the relationship between gas pressure and spacing (Pressure×spacing= constant), a close spacing allows for higher optimum pressures, giving a higher saturation intensity for higher power as well as a broader gain line. This, combined with the closely spaced longitudinal modes assures more stable amplitude operation. Modes parallel to the electrodes are free space in nature, providing hybrid propagation. In other types of lasers, a similarly-configured cavity operates in free space mode in both directions. Spherical mirrors are disposed near the ends of the electrodes to form the optical resonator. The mirrors are substantially identical except that one of the mirrors has a small transmissive aperture for coupling laser energy out of the cavity. The precise radius of curvature of each mirror and the precise distance between the two mirrors are selected to cause a laser beam to traverse the resonator with a plurality of off-axis traversals to trace out a plane through the gain region before exiting through the aperture in the first spherical mirror. The beam radii within the resonator and at the mirrors for each of the free space and the waveguide modes should be as close as possible to each other. Similar principles may be applied to a laser crystal to provide off-axis, multi-beam operation in appropriate solid state lasers.

In an exemplary embodiment of a $CO_2$ laser, a vacuum-tight housing and an electrode pair are made of high purity copper. The electrode spacing is small enough to act as a waveguide, e.g., less than 3 mm. An RF feed-through with a copper conductor passes through the housing to provide electrical connection with one of the electrodes. The sidewalls of the discharge region are made from beryllia. Stainless steel end plates and mirror mounts support the spherical mirrors a short distance from the ends of the electrodes. Copper cooling chambers are attached to the housing exterior. In addition to guiding the beam, the close spacing of the electrodes facilitates efficient gas cooling by way of thermal diffusion to the electrode plates. Higher power is achieved primarily by increasing the electrode width to widen the RF discharge, although some lengthening may be employed as well. The mirror separation and curvature are selected to provide a plurality of cavity traversals such that, after the plurality of traversals, wherein a linear plane is traced out through the gain region, the beam returns to its starting point for coupling out of the cavity through a transmissive aperture in one of the mirrors.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to like parts and in which:

FIG. 1 is a diagrammatic side view of an exemplary laser cavity according to the present invention;

FIG. 2 is a cross-section taken along line 2—2 of FIG. 1;

DETAILED DESCRIPTION OF PREFERRED EMBODIMENTS

Figure 3:
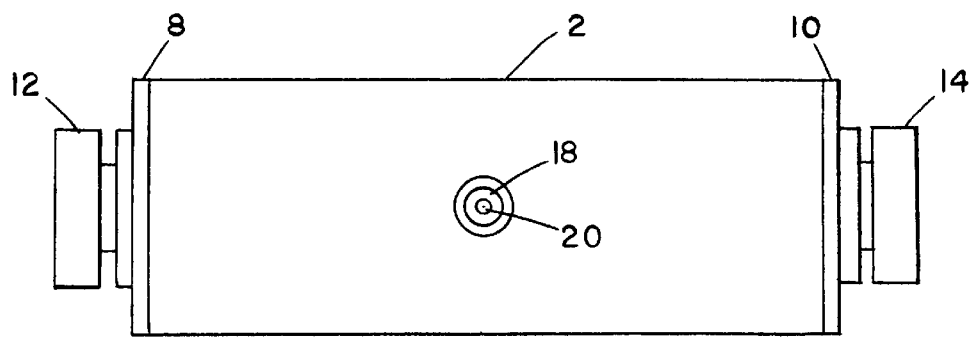
FIG. 3 is a top view of an exemplary laser.

As illustrated in FIGS. 1–3, an RF transversely excited $CO_2$ laser 1 comprises a housing 2 and electrodes 4 and 6, all of which are formed from high purity copper (Cu 101). Other materials are known for forming the electrodes, including aluminum, gold, brass, which may be in the form of solid metal or plated. Housing 2 is preferably made of a rectangular copper tubing. The ends of housing 2 are capped with end sections 8,10 and mirror mounts 12, 14, all of which are made of 304 and/or 316 stainless steel. Identical spherical mirrors 32,34, which will be described in more detail later, are disposed within mirror mounts 12, 14. (Note that the curvature of the mirrors as illustrated is exaggerated for clarity.) RF feed 16 passes through the upper side of housing 2, providing electrical contact between electrode 4 and the RF supply (not shown). RF feed 16 is formed from an alumina ceramic tube 18 and copper conductor 20. Interior sidewalls 22,24, while not necessary, can be included to provide lateral plasma confinement and cooling as well providing means for supporting upper electrode 4 and maintaining the desired electrode spacing 26. The sidewalls are formed of a ceramic material, preferably beryllia, which possesses good thermal conductivity. The combined sidewalls 22 and 24 and electrodes 4 and 6 create a substantially rectangular cavity. Alternatively, electrode placement and spacing can be achieved by mounting the electrodes on supports which extend inwardly from the top and bottom of the housing.

All materials are selected for suitability for high vacuum applications. The various components are assembled by vacuum brazing to form a vacuum-tight enclosure. Attached to the lower side only, or both the upper and lower sides, of housing 2 are cooling chambers 30 through which water or other suitable coolant is passed for diffusion cooling of the housing 2 and electrodes 4,6. Cooling chamber 30, which may be copper, aluminum, or other suitable material having high thermal conductivity, include one or more channels 36 or other passageways which are open to the outer surface of housing 2. Therefore, the means by which cooling chamber 30 is attached to housing 2 must be sealed against leakage. Alternatively, the cooling chamber may, itself, be sealed by a thin, thermally transmissive layer, which is then abutted against the outer surface of housing 2. The cavity interior is conditioned with oxygen after brazing to build up a hard copper oxide (CuO) layer on the interior walls. Conventional conditioning methods that are known to those of skill in the design and construction of D.C- excited $CO_2$ waveguide lasers are used for the vacuum station and seals. RF matching is performed to obtain appropriate standing wave ratios (VSWR≦1.3), as is known in the art.

The parameters of the laser cavity were determined using a number of equations for predicting and designing off-axis multi-pass laser resonators.

For re-entrant, off-axis spherical mirror interferometers, $$\cos \theta = 1 - (L/R) = g_i \quad (1)$$

where

R is the radius of curvature of identical spherical mirrors;

L is the spacing between the mirrors; and $g_i$ is the "g factor". (See, e.g., D. Herriott, et al., "Off-Axis Paths in Spherical Mirror lnterferometers", *Applied Optics* 3:4, April 1964, pp. 523– 526.)

The "re-entrant condition" imposes limits on the value of θ according to:

$$2\nu\theta = 2\mu\pi \quad (2)$$

where ν and μ are integers, ν>μ. In addition, $-1 < g_i < 1$. The latter relationship is recognized as a condition of a stable resonator. Taking this one step further, it was generally found during development of the inventive cavity design that $0 < g_i < 1$.

The term "re-entrant" means that after ν round trips, the beam returns to its starting position. Where μ=1, the beam returns to its starting point, in phase, along the initial axis after 2ν mirror bounces. In the case of μ=2, the beam sweeps out the cavity twice, such that the beams reflect off of the mirrors μν times, while making ν round trips. If ν/μ is an integer, the beam returns along its initial axis after ν round trips. Where μ=2 or 3, for example, useful oscillator or amplifier configurations which sweep out the excited volume completely, occur when the ratio ν/μ is not an integer.

Figure 4:
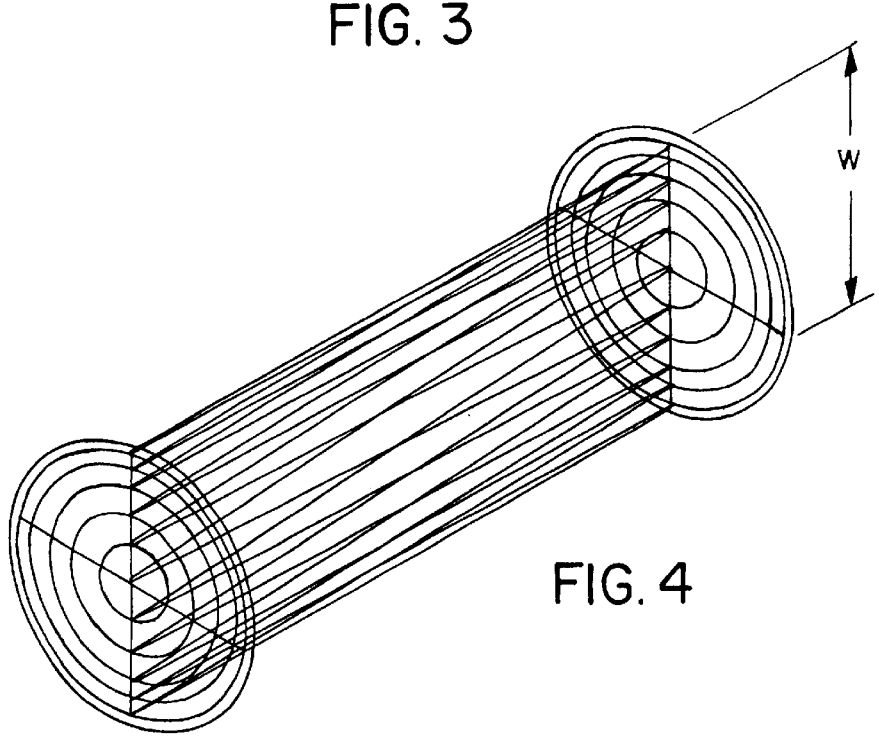
FIG. 4 is a ray plot of the path swept out by a laser beam in an off-axis multi-path resonator of the present invention.
Figure 5:
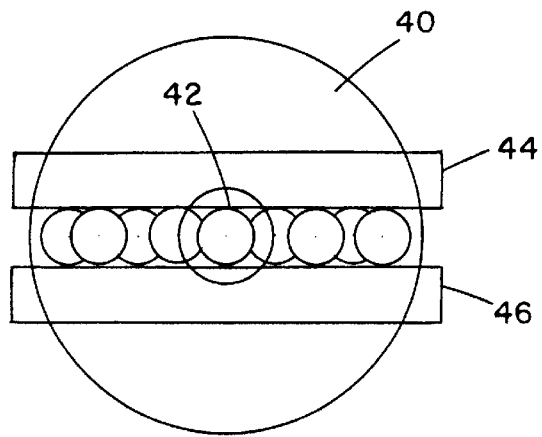
FIG. 5 is a diagrammatic view of the exit mirror showing a representation of the linear pattern impinging upon the ends of the laser cavity according to the present invention.

A computer ray tracing program may be used to investigate different potential cavity configurations. In the exemplary embodiment, the Beam 4™ program, available from Stellar Software of Berkeley, Calif. was used. Other software appropriate for ray tracing is commercially available and is generally known in the art. FIGS. 4 and 5 illustrate an exemplary sweep of the beam through the gain region of the cavity. FIG. 4, generated by the Beam 4™ software, shows the beam path in an off-axis multi-path resonator such as used to construct the laser cavity of the present invention. It should be noted that the discharge width w is disproportionally enlarged for clarity, and ν=13 and μ=2. FIG. 5 shows an exemplary path traced on the output mirror 40 with aperture 42, for the condition of ν=9 and μ=2. Upper and lower electrodes 44 and 46 are shown for reference. The laser spots are shown as circles with slanted lines to clearly show the nine separate intersections with mirror 40.

Free space modes of stable resonators having identical mirror radii are given by Equations 3 and 4.

$$(w_0)^2 = \frac{L\lambda}{\pi} \sqrt{\frac{(1+g_i)}{4(1-g_i)}} \quad (3)$$

where $w_0$ is the beam waist radius at the $e^{-2}$ intensity points in the center of the cavity and λ is the wavelength, and $$\frac{w_1}{w_0} = \sqrt{\frac{2}{(1+g_i)}} \quad (4)$$

where $w_1$ is the beam radius at the mirrors.

To assure that the gain region is fully swept out by the beam, the following conditions should exist:

$$\frac{W}{\nu(2w_0)} \leq 1 \quad (5)$$

where W is the width of the gain region. In the exemplary embodiment with an electrode spacing of 2.6 mm, $w_0=0.8$ mm.

Whenever μ=2, the ratio set forth in Equation 5 will, for all practical purposes, be 0.75±0.15.

An important consideration in the exemplary $CO_2$ laser cavity according to the present invention is that the free space beam radius values, $w_0$ and $w_1$, be as close as possible to the corresponding values for the wave guide mode. As previously stated, for the wave guide mode, $w_0=0.8$ mm and $w_1=0.9$ mm. In addition, the free space values of $w_0$ and $w_1$ should have a reasonably constant size in the cavity. Without this constant size limitation, the free space beam will flare out from the center of the discharge to the mirror. Such flaring out behavior is indicative of certain undesirable qualities. For example, a relatively small value of $w_0$ near the center of the discharge implies a smaller than desired saturation of the power in this region. Additionally, too large a flaring out of the mode at the mirrors leads to excessive leakage loss when the beam is near the output coupling region in the front mirror.

In the exemplary embodiment of the RF transversely excited $CO_2$ lasers, the electrode spacing was selected to be on the order of 2.6 mm, such that the modes perpendicular to the electrodes are expected to be waveguide in nature, whereas the modes parallel to the electrodes are free space in nature, i.e., hybrid modes. At shorter wavelengths, such as for carbon monoxide (~5.5 μm), xenon-helium (~3.5 μm), or solid state lasers near 2–3 μm, all modes will likely be free space modes.

For waveguide lasers, primarily $CO_2$, having a bore diameter 2a, about 98% of the $EH_{11}$ waveguide mode energy couples into the $TEM_{00}$ gaussian free space mode when the ratio of $w_0/a$ is 0.6435. A value of $w_0/a=0.69$ is appropriate for a square or rectangular waveguide when 2a corresponds to the electrode spacing.

In order to estimate diffraction coupling losses at mirror reflections for waveguide modes, the parameter b is introduced:

$$b = \frac{\pi w_0^2}{\lambda} \quad (6)$$

Using the above value for $w_0$, b=20.74 cm. If the distance from the end of the waveguide, i.e., the ends of electrodes 4,6, and R, the mirror radius of curvature, obey the relationships shown in Equation 7, the two dimensional diffraction coupling losses are less than 3%.

$$\frac{z}{b} \le 0.1 \quad \frac{R}{b} \ge 5 \quad (7)$$

In the exemplary embodiment, z=2.2 cm, and R=1.5 m for a 30 W laser and R=1.75 m for 60 W and 120 W lasers, thus satisfying the relationships set forth in Equation 7 to provide losses of about 2.8%. One dimensional losses of the hybrid modes can be taken as half of the two dimensional coupling losses, or about 1.4%. Mirrors with reflectivities which are on the order of 99.6% introduce additional loss. The net estimated loss at each mirror reflection for all but the output coupling aperture is approximately one-half the diffraction coupling loss plus the mirror reflectivity loss, or about 1.8%. There are additional losses from scatter and Poynting vector absorption into the electrodes. Assuming a 1.2% waveguide loss per pass, the total loss per pass is 3%. Such losses should be kept small if near optimum operation is to be maintained for relatively short multi-pass cavities of the present invention.

The front and rear mirrors are coated for maximum reflection (99.6%). The rear mirror in the preferred embodiment is made of silicon and is non-transmissive at 10 μm. The front mirror is made from ZnSe, which is transmissive at 10 μm with a refractive index of 2.4. A circular region, approximately 2.5 mm in diameter, is left in the center of the front mirror, is coated to have a reflectivity of about 60%, permitting about 40% of the lowest order free space mode to be coupled out.

To determine laser power P, the average loss per centimeter α and effective gain per centimeter g are determined according to the relationships set forth in Equations 8 and 9.

$$\alpha = A/2l \quad (8)$$

where

A is the effective round trip loss of an unfolded multipath laser cavity;

l is the multipath gain length in cm ($l_0 \times \mu \times \nu$), where $l_0$ is the single pass gain length.

$$g = (g_0 - \alpha) \quad (9)$$

where $g_0$ is the small signal gain per cm.

The usual form of the power equation is given by $$P = \frac{t}{t+A} \cdot gl \cdot I_S A_B \cdot \left(1 - \frac{t+A}{2gl}\right) \quad (10)$$

where $A_B$ is the beam area; and $I_S$ is the saturation intensity in watts/cm².

However, under multipass conditions, all cavity losses are absorbed in the distributed loss term α, which reduces the small signal gain to provide an effective gain. Therefore, the expected output power is:

$$P = gl \cdot I_S A_B \cdot \left(1 - \frac{t}{2gl}\right) \quad (11)$$

Due to diffraction, the output laser beam will experience a small angular spread, the range of which varies with laser power. The amount of angular spread can be determined using ray tracing techniques such as those mentioned above. For half angles φ<(0.005 rad), the ray makes many passes near the central, uncoated aperture, resulting in excessive losses. For half angles φ>(0.009 rad), the beam paths at the edges exceed the width of the electrodes. Different electrode widths are selected for different laser powers.

EXAMPLE 1

In an experimental $CO_2$ laser construction, the housing and electrodes were made from high purity copper (Cu 101). The end sections which capped the laser and included the mirror mounts were formed form 304 and 316 stainless steel. The RF feed was formed from alumina ceramic and copper, and the interior sidewalls of the discharge region were made of beryllia. All materials are considered good for high vacuum applications. The parts were joined together using vacuum brazing techniques which are known in the art. The laser interior was conditioned with oxygen after brazing to form a hard copper oxide on the interior walls. Other conditioning of the vacuum station and seals was achieved using techniques that are known in the art for providing long-life D.C.-excited $CO_2$ waveguide lasers. Typical standing wave ratios after RF matching (VSWR) were ≦1.3. The experimental laser was operated at 41 and 75 MHz, however, it is anticipated that for the configuration used, 110 MHZ may be closer to optimum.

The copper electrodes were 23.5 cm long, 1.4 cm wide, with an electrode gap of 2.7 mm. The spherical mirrors were spaced 28.07 cm apart and each had a radius of curvature of 120 cm for the case μ=2, ν=9. The values of the lowest order free space modes in the plane of the laser axis were $w_0$=1.14 mm and $w_1$=1.21 mm. Perpendicular to the laser axis, $w_0$=0.91 mm. The front and rear mirrors had a nominal reflectivity of 99.6%, with the exception of a 2.5 mm circle in the center of the front mirror, through which the output beam was coupled, which had a reflectivity of 60%. Operating temperatures were set and maintained between 20° C. and 25° C. using a water cooler manufactured by NESLAB Instruments, Inc. Different pressures and gas mixture ratios were investigated, with near optimum values being obtained with a mix ratio of He:$CO_2$:CO:Xe of 70:17:8:5, with a pressure P of 62 Torr±2 Torr at 75 MHz drive frequency and 67 Torr±3 Torr at 41 MHz drive frequency. These results indicated that for a ratio of electrode gap:width (W/d) of ≈5.5, P.d≈17 Torr.cm.

After a 15 minute warm-up, with 225 watts of RF input, essentially single mode operation can be obtained with powers of 7.4 W±1 W at 41 MHz and 18 W±0.5 W at 75 MHz. Stability was good at 75 MHz and provided output comparable to conventional commercial D.C.-excited waveguide lasers that are 2.5 meters long with spacing between longitudinal modes of ≈60 MHz. The 41 MHz laser was also operated with multimode mirrors, producing a best power of 12 W, however, amplitude stability was poor.

Voltage-flattening coils, such as those described by D. He and D. R. Hall in "Longitudinal voltage distribution in transverse RF discharge waveguide lasers", *J. Appl. Phys.*, 54:4367, August 1983, were incorporated in a 75 MHz laser, providing a slightly improved power output at higher RF input powers and improved stability over the lower range of RF input powers.

Two beams exited the central aperture of the front mirror at an angle of about 1.5 degrees. At 17 cm from the front mirror, the beams formed two clean circular spots which were stably persistent to all distances observed using thermal image plate. No higher order modes were indicated, and the two beams can be merged using a flat mirror. Ray traces showed that the beam paths were more concentrated at the outer edges, away from the central axis. This outer edge concentration is a useful feature in reducing operating temperature using sidewall cooling. The beryllia sidewalls efficiently conduct heat to the lower electrode and help equilibrated the temperature between the upper and lower electrodes. The upper electrodes were calculated to be only about 8–10° C. warmer that the lower electrode, with the lower electrode being within 1° C. of the cooling water temperature. This temperature differential will vary somewhat with the laser dimensions. The near-equilibrium of the upper and lower electrode temperatures mitigates problems which may arise from gas index of refraction gradients that are driven by thermal gradients.

EXAMPLE 2

Carbon Monoxide Laser

The above-described $CO_2$ laser construction could be readily adapted by one skilled in the art for use as a CO laser, with the major parametric difference being smaller free space mode values due to the shorter wavelength (~5.5, $\mu$m). The free space mode values $w_0$ and $w_1$ would be 0.82 mm and 0.87 mm respectively, such that the laser would not operate in hybrid mode, but only in free space modes. Diffraction coupling losses would also be significantly smaller.

EXAMPLE 3

Mini TEA $CO_2$ Laser

The following parameters could be used to construct a transversely excited atmospheric pressure laser: gain length=15 cm, mirror separation=20 cm; electrode width= 12.5 mm and gap=3 mm. If $\mu$=2 and $\nu$=9, the mirror radii of curvature are 85.5 cm and the value of $w_0$, $w_1$ of the lowest order free space modes are 0.97 and 1.03 mm, respectively. Laser energy would be coupled out of a central aperture (~2.5 mm) of the front mirror. If the duty time were small, on the order of 20 Hz, or if the laser were only turned on for a short time, the laser could be air cooled with a small fan, or not cooled at all. Such a compact device could have numerous applications in military or medical systems.

EXAMPLE 4

Xenon-Helium Laser

The Xe—He laser produces light at about 3.506 $\mu$m. An exemplary construction would include an electrode length of 11 cm, mirror spacing of 16 cm, with radius of curvature one the order of 1 m, transverse discharge with an electrode spacing of 2.4 cm, and electrode width of 10 mm. The round trip and multipass values are $\mu$=2 and $\nu$=11, respectively. All modes are free space modes with $w_0$=0.55 mm and $w_1$=0.57 mm. The beam is coupled out of the cavity at the front mirror through an aperture. Given the high gain of this laser, the aperture can be left uncoated. The Xe—Ne laser could be operated CW or pulsed with RF excitation.

The effective gain length is 121 cm and the device, with a size of about 19 cm long and 5 cm on a side, could easily be hand-held.

EXAMPLES 5 and 6

Solid State Lasers

High gain solid state lasers such as neodymium:yttrium-aluminum-garnet (Nd:YAG), which typically have intracavity elements, including Q switches and frequency doubling crystals, may not be good candidates for off-axis multi-pass cavities. However, some solid state lasers which can be operated CW, such as Tm:YAG, or Tm:Ho:YAG (or YLF), or with longer pulses (~50–300 $\mu$sec.), such as Tm:YAG, Tm:Ho:YAG, Er:YAG, or with other host crystals YLF, YALO, etc., and without intracavity elements might be good candidates for use with off axis multi-pass cavities.

EXAMPLE 5

Er:YAG Laser

Figure 6:
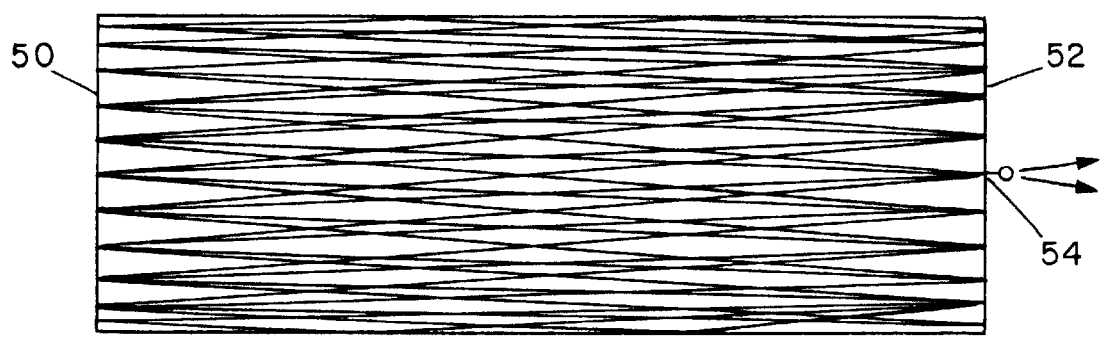
FIG. 6 is a ray plot of the path swept out by a laser beam in an off-axis multi-path resonator.

The Er:YAG laser, when heavily doped ($\mu$50%) with $Er^{3+}$, emits at about 2.94 $\mu$m, making it an attractive laser for surgery given the large water absorption near 3 $\mu$m. For a refractive index of 1.75, a crystal length of 75 mm, crystal width of 6.3 mm, $\mu$=2, and $\nu$=13, the simulated paths swept out within the crystal are shown in FIG. 6. (The width is exaggerated in the figure for clarity.) For a radius of curvature of 65.48 cm, $w_0$=0.29 mm and $w_1$=0.30 mm. The crystal ends 50, 52 are radiused and reflectively coated except for a small central aperture 54 in the center of one end through which the beam is coupled out of the crystal. This aperture may be left uncoated and may be shaped as a rectangle to facilitate fabrication. Given the long effective length of the crystal gain medium (975 mm), there should be enough radiant buildup that little feedback is required from the central aperture. The aperture may be used to tailor the pulse width characteristics of the laser as well as control its power. A relatively large aperture width of about 1.2 mm will discourage higher order modes which have larger cross-sections and suffer greater losses on two of the thirteen front mirror bounces.

Fabrication of the Er:YAG laser crystal can be achieved by radiussing a rod at each end, then grinding down the sides along the length of the crystal to a thickness of about 2.5 mm. The thickness of the crystal corresponds to the electrode spacing in the above-described gas lasers, with the thickness being less than the width to create the wide area or slab structure.

EXAMPLE 6

Tm:YAG, Tm:Ho:YAG (or YLF, YALO, etc.)

Construction of such lasers for emitting radiation near 2.05 $\mu$m is similar to that described above for Er:YAG, with differences arising from the shorter wavelength and that they may be diode pumped.

Figure 7:
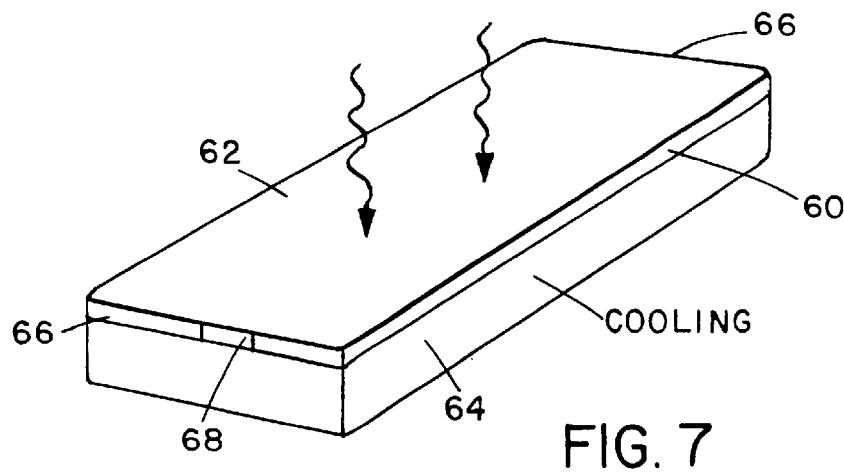
FIG. 7 is a perspective view of a compact solid state laser with an off-axis multi-path resonator.
Figure 8:
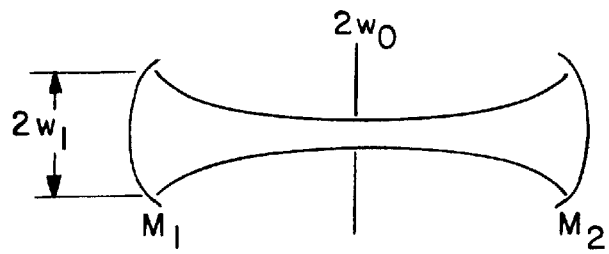
FIG. 8 is a diagrammatic view of a prior art Fabry-Perot interferometer with spherical mirrors.
Figure 9A:
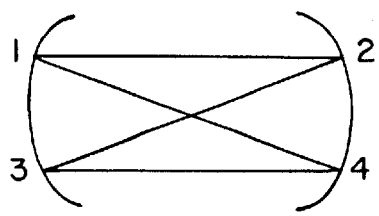
FIGS. 9a and 9b are diagrammatic views of prior art multi-axis interferometers in which a ray makes two roundtrips and three roundtrips, respectively.
Figure 9B:
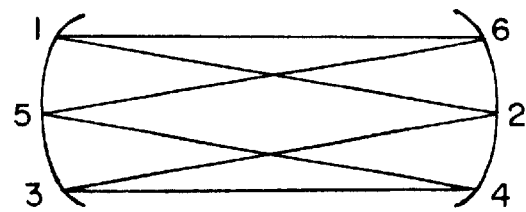

The shorter wavelength is reflected by smaller values of $w_0$ (0.188 mm) and $w_1$ (0.192 mm). This group of lasers is strongly absorbing at 785 nm, permitting diode pumping. In an exemplary construction, a laser crystal 60 having dimensions 40 mm long and 5 mm wide is diode pumped along one long flat surface 62 and cooled on the opposite surface 64, as shown in FIG. 7. For $\mu$=2 and $\nu$=15, the radius of curvature of the end mirrors 66 is 46.27 cm, with aperture 68 formed in the front mirror 66. The end mirrors are illustrated with an exaggerated curvature for clarity. An alternate configuration, with $\mu=1$ and $v=20$, may be constructed by moving the exit aperture from the center to the extreme side.

For the solid state lasers which are described above, a significant advantage is derived from the fact that the radiused and coated crystal is free of the thermal, vibration and shock misalignment problems inherent in lasers with external cavities.

The off-axis multi-pass laser cavity of the present invention represents a significant improvement over known wide area or slab lasers, providing stable, durable and compact construction with efficient generation of useful output power levels. The closely spaced electrode plates not only guide the beam, but also allow efficient thermal diffusion cooling to the electrode plates. Since the optimum pressure for closely spaced electrode plates is higher, according to the relationship (pressure×spacing)=constant, a higher saturation density can be attained, thus generating higher power as well as a broader gain line, which, combined with the closely spaced longitudinal modes assures more stable amplitude operation. Higher powers can be achieved by widening the RF discharge and/or making it longer.

The principles disclosed herein for a multi-pass laser cavity may be similarly applied to the construction of a laser amplifier for increasing the output intensity of a primary laser. In such an amplifier, an input aperture may be provided, for example, in the mirror opposite the output aperture.

It will be apparent to those skilled in the art that various modifications and variations can be made in the system and method of the present invention without departing from the spirit or scope of the invention. Thus, it is intended that the present invention cover the modification and variations of this invention provided they come within the scope of the appended claims and their equivalents.

We claim:

1. An optical cavity for a wide area laser oscillator comprising:
   a waveguide structure having a transverse width, a length and a vertical spacing collectively defining a gain region, the waveguide structure having an axis extending along its length;
   a first spherical mirror and a second spherical mirror disposed near opposite ends of the waveguide structure to define a resonator, the first and second spherical mirrors separated by a distance L and having a substantially identical radius of curvature R, the first spherical mirror having a transmissive aperture formed at its center, wherein a laser beam traverses the resonator with a plurality of off-axis traversals v to trace out a plane around the gain region before exiting through the aperture in the first spherical mirror, and wherein the distance L is determined according to the equations $\cos[(\mu/v)\pi]=1-(L/R)=g$, for integers $\mu<v$, and where $-1<g<1$.

2. An optical cavity as in claim 1, wherein the waveguide structure is a laser crystal and the first and second spherical mirrors are a first end and a second end of the laser crystal.

3. An optical cavity as in claim 1, wherein the laser beam has a beam radius $w_1$ at each of the spherical mirrors in each of a vertical and a transverse direction, wherein the beam radius $w_1$ in the vertical direction is as close as possible to the beam radius $w_1$ in the transverse direction.

4. An optical cavity as in claim 1, wherein the laser beam has a beam radius $w_0$ in a center of the resonator in each of a vertical and a transverse direction, wherein the beam radius $w_0$ in the vertical direction is as close as possible to the beam radius $w_0$ in the transverse direction.

5. An optical cavity as in claim 4, wherein the beam radius $w_0$ the transverse direction is substantially constant within the gain region.

6. An optical cavity as in claim 1, wherein the waveguide structure is formed by a pair of electrode plates separated by the vertical spacing, and the waveguide structure is filled with a laser gas.

7. An optical cavity as in claim 5, wherein the laser gas is carbon dioxide and the vertical spacing is selected so that the laser beam perpendicular to the electrode plates propagates in a waveguide mode and the laser beam parallel to the electrode plates propagates in a free space mode.

8. An optical cavity as in claim 5, wherein the laser gas is carbon monoxide.

9. An optical cavity as in claim 5, wherein the laser gas is xenon-helium.

10. An optical cavity as in claim 5, further comprising a cooling chamber disposed in thermal contact with each of the pair of electrode plates.

11. An optical cavity as in claim 5, wherein the laser beam perpendicular to the electrode plates and the laser beam parallel to the electrode plates each propagates in a free space mode.

12. An optical cavity as in claim 5, further comprising a vacuum-tight housing having a pair of endplates, each endplate having a mirror mount for retaining one of the first and second spherical mirrors.

13. An optical cavity as in claim 6, wherein the pair of electrodes are formed from copper.

14. An optical cavity as in claim 6, further comprising ceramic sidewalls disposed along the length of the waveguide structure.

15. An optical cavity as in claim 5, wherein the plurality of off-axis traversals comprises a plurality of round trips within the resonator.

16. An optical cavity as in claim 15, wherein the plurality of off-axis traversals further comprises at least one complete tracing around the gain region of the waveguide structure.

17. An optical cavity as in claim 15, wherein the plurality of off-axis traversals further comprises at least one complete tracing around the gain region of the waveguide structure.

18. An optical cavity structure for a gas laser, the cavity comprising:
   a housing having a first end and a second end;
   a pair of electrode plates disposed within the housing, the pair of electrode plates being spaced apart by an electrode gap to form a waveguide, each electrode plate having a width greater than the electrode gap;
   an RF feedthrough passing through the housing for providing an RF excitation signal to one of the pair of electrode plates;
   a pair of spherical mirrors, one spherical mirror disposed at each of the first end and the second end of the housing and aligned with an axis of the waveguide to form a resonator, each mirror of the pair of spherical mirrors having a radius of curvature, the spherical mirror at the second end having a transmissive aperture for coupling laser radiation out of the waveguide;
   wherein the radius of curvature R of the pair of spherical mirrors and a distance L between the spherical mirrors are selected to cause a laser beam to traverse the resonator with a plurality of off-axis traversals v to trace out a plane around the gain region before exiting through the aperture in the spherical mirror at the second end; and wherein one of the distance L and the radius of curvature R is determined according to the equations $\cos\theta = 1-(L/R)=g$, where $-1<g<1$, and $\theta=(\mu/\nu)\pi$, for integers $\mu<\nu$.

19. The optical cavity structure of claim 18, wherein the electrode gap is selected so that the laser beam perpendicular to the electrode plates propagates in a waveguide mode and the laser beam parallel to the electrode plates propagates in a free space mode.

20. The optical cavity structure of claim 18, wherein the housing is formed from copper.

21. The optical cavity structure of claim 18, wherein each of the electrode plates is formed from copper.

22. The optical cavity structure of claim 18, further comprising a ceramic sidewall disposed on each side of the pair of electrode plates.

23. The optical cavity structure of claim 18, wherein the laser beam has a beam radius $w_0$ in a center of the resonator in each of a vertical and a transverse direction, wherein the beam radius $w_0$ in the vertical direction is as close as possible to the beam radius $w_0$ in the transverse direction.

24. The optical cavity structure of claim 18, wherein the plurality of off-axis traversals comprises a plurality of round trips within the resonator.

25. The optical cavity structure of claim 24, wherein the plurality of round trips is nine or more round trips.

26. The optical cavity structure of claim 24, wherein the plurality of off-axis traversals further comprises at least one complete tracing around a gain region of the resonator.

27. A carbon dioxide laser comprising:
a thermally conductive housing having a first end and a second end, adapted for retaining a carbon dioxide gas under a vacuum;
a pair of electrode plates disposed within the housing, the pair of electrode plates being spaced apart by an electrode gap to form a waveguide, each electrode plate having a width greater than the electrode gap;
an RF feed through passing through the housing for providing an RF excitation signal to one of the pair of electrode plates to excite the carbon dioxide gas;
a pair of spherical mirrors, one spherical mirror disposed at each of the first end and the second end of the housing and aligned with an axis of the waveguide to form a resonator, each mirror of the pair of spherical mirrors having a radius of curvature, the spherical mirror at the second end having a transmissive exit aperture for coupling laser radiation out of the waveguide;
a cooling chamber abutting an exterior of the housing;
wherein the radius of curvature R of the pair of spherical mirrors and a distance L between the spherical mirrors are selected to cause a laser beam to traverse the resonator with a plurality of off-axis traversals v to trace out a plane around the gain region before exiting through the exit aperture in the spherical mirror at the second end; and
wherein one of the distance L and the radius of curvature R is determined according to the equations $\cos\theta = 1-(L/R)=g$, where $-1<g<1$, and $\theta=(\mu/\nu)\pi$, for integers $\mu<\nu$.

28. A carbon dioxide laser as in claim 27, wherein the electrode gap is selected so that the laser beam perpendicular to the electrode plates propagates in a waveguide mode and the laser beam parallel to the electrode plates propagates in a free space mode.

29. A carbon dioxide laser as in claim 27, wherein the thermally conductive housing is formed from copper.

30. A carbon dioxide laser as in claim 27, wherein each of the electrode plates is formed from copper.

31. A carbon dioxide laser as in claim 27, wherein the laser beam has a beam radius $w_1$ at each of the spherical mirrors in each of a vertical and a transverse direction, wherein the beam radius $w_1$ in the vertical direction is as close as possible to the beam radius $w_1$ in the transverse direction.

32. A carbon dioxide laser as in claim 27, wherein the laser beam has a beam radius $w_0$ in a center of the resonator in each of a vertical and a transverse direction, wherein the beam radius $w_0$ in the vertical direction is as close as possible to the beam radius $w_0$ in the transverse direction.

33. A carbon dioxide laser as in claim 27, further comprising a ceramic sidewall disposed on each side of the pair of electrode plates.

34. A carbon dioxide laser as in claim 33, wherein the ceramic sidewall is formed from beryllia.

35. A carbon dioxide laser as in claim 27, wherein the plurality of off-axis traversals comprises a plurality of round trips within the resonator.

36. A carbon dioxide laser as in claim 35, wherein the plurality of off-axis traversals further comprises at least one complete tracing around a gain region of the resonator.

37. A carbon dioxide laser as in claim 35, wherein the plurality of round trips is nine or more round trips.

38. A carbon dioxide laser as in claim 37, wherein the beam radius $w_0$ the transverse direction is substantially constant within the gain region.

* * * * *